UNITED STATES PATENT OFFICE.

JOHN THOM, OF CHORLEY, AND JOHN STENHOUSE, OF PENTONVILLE, LONDON, GREAT BRITAIN.

IMPROVEMENT IN RECOVERING FATTY AND COLORING MATTERS FROM WASTE WASH-LIQUORS.

Specification forming part of Letters Patent No. 137,636, dated April 8, 1873; application filed February 11, 1873.

*To all whom it may concern:*

Be it known that we, JOHN THOM, of Chorley, in the county of Lancaster, and JOHN STENHOUSE, of Pentonville, London, in the county of Middlesex, both in the Kingdom of Great Britain and Ireland, have invented Improvements in Treating Fatty Substances containing Coloring-Matters and in obtaining useful products therefrom, of which the following is a specification:

It has long been known that during the clearing or brightening with soap of woven fabrics or yarns dyed or printed with madder or its derivatives, munjeet or its derivatives, or with the various kinds of artificial alizarine, a considerable quantity of valuable coloring-matter leaves the dyed or printed goods and remains in the waste soap-liquor. It has been also long known that by adding earthy or metallic bases, or their salts, or solutions of such bases or salts, such as those of lime, alumina, baryta, magnesia, to the colored waste soap-liquors, such as are above referred to, a precipitate is formed which contains fatty matters associated with coloring-matters thrown down from the waste liquor.

Our invention consists in the use of a process of treating precipitates of the character above referred to so as to recover therefrom so much of the coloring-matters as will be found valuable for dyeing purposes, and which, having due regard to economy, it may be worth while to recover, and also to recover in a useful form the fatty matters which were present with the said coloring-matters.

The mode in which we carry our process into practical operation will be well understood from the following description, in which, with the object of making it completely intelligible, we will describe the entire operation of first producing the precipitates and then of treating them by our process. We run a solution of muriate of lime (which we prefer) into the waste soap-liquor until no further precipitation takes place, and the mixed liquors are then run into a pit or cistern, or we run the solution of muriate of lime into the pit either before or after we run in the waste soap-liquors. When the pit or cistern is about full of the said liquors, milk of lime is added until free lime remains in the mixture; about twenty gallons of milk of lime, containing about forty three pounds of quicklime being sufficient for twenty thousand gallons of the soap-liquor, the whole being well stirred up so as to insure a uniform mixture having a slight excess of lime. The whole is allowed to settle about twelve hours, when the supernatant liquor is drawn off. The precipitate contains the fatty and coloring matters previously contained in the waste soap-liquor. We then pump this precipitate, or run it off, into a wooden vat or other receptacle, and add to it an acid, taking especial care to use it in such a quantity as only to decompose the compounds of fatty matter with their base or bases wholly or nearly so, but not in quantity sufficient to decompose the compounds of coloring-matter with their bases. In practice we find that to thirty-five thousand eight hundred and sixty pounds' weight of this precipitate an addition of three hundred and ten pounds, or thereabout, of muriatic acid of commerce containing thirty-three per cent. of dry acid, or thereabout, is sufficient. This is done at the usual temperature of the air. If, in any case, some of the precipitates proposed to be operated upon have already been treated with acid, we in such case examine them by analysis, or otherwise, so as to ascertain in what proportion the acid has been employed in so treating such precipitates. If the acid should be found to have been used in about the same proportion as that above indicated, the precipitate will be in a state we find to be suitable for use according to our invention.

If the precipitate, on examination, shall be found to have been treated with too small a quantity of acid, it should be further treated with such an additional quantity as may make it about equivalent to the proportion above indicated as being suitable. If it shall be found that an excess of acid has been employed, so as to have removed not only the base or bases of the fatty compound, but likewise the base or bases of the valuable coloring compounds, then it is possible, as shown hereafter, to add or restore bases which will replace those removed injuriously by the excess of acid, and such a method is in that case, to a certain extent, equivalent to our process of treating the said compounds, because the mischief that arises from the coloring-matter being free from base, and so rendered soluble in the grease or fatty matter, is to some extent prevented, though not nearly so well as by our process above described.

Having then properly prepared the precipitates by the acid treatment, which wholly decomposes the fatty compounds with their bases, or nearly so, but which does not decompose the coloring-matters with their bases, we next draw off the whole of the matter so treated onto a suitable filter, preferring to use a flannel stretched on a wooden frame for the filter, this filter being so placed that the liquor draining from it, and which is chiefly a solution of muriate of lime, may be run off into and mix with a fresh quantity of soap-liquor. The fatty and other materials left on the filter are removed, and we then heat them until they have reached such a temperature as to melt or agglutinate the colored fatty substance. We then allow the whole to cool and then press in bags or cloths to separate from it as much of the watery solution as possible.

The colored fatty substance removed from the bags or cloths, if thought desirable, may be heated to such a temperature as to evaporate or separate the greatest portion of the water, taking care not to raise the temperature so as to decompose the alizarine or other valuable coloring-matters contained in the substance. In practice, we prefer not to exceed 212° of Fahrenheit's thermometer.

In the case of treating a fatty mixture from which those portions of the bases which existed in combination with the fat are entirely removed, and those portions of the base or bases combined with the coloring-matter are either partially or entirely removed, we proceed by reintroducing a base or bases in sufficient quantity to combine with the useful coloring-matter.

The following bases may be employed for this purpose: lime, its hydrate or acetate; baryta, its hydrate or acetate; strontia, its hydrate or acetate; magnesia, its hydrate or acetate; finely-powdered oxide of lead, oxide of zinc, oxide of iron, oxide of manganese, or the acetates of the metals just mentioned.

We find that alumina, hydrate of alumina, or acetate of alumina can also be used, provided that the fat and coloring matter be made neutral or slightly alkaline, ammonia being usually employed for this purpose. When the coloring matter has combined with the alumina we make the mass slightly acid by the addition of a small quantity of acetic or other acid, and then proceed to heat it. The bases and salts which we prefer are lime, its hydrate and its acetate, oxide of iron and its acetate, these being cheap and effective agents. The quantity of the above bases to be added will be dependent on the quantity of coloring-matter mixed or combined with the fatty matter. In practice we find that the quantity of coloring-matter associated with the fat varies so much that no definite quantity of these oxides or their solutions can be here stated, and we find it necessary to make an experiment in order to decide upon the proper amount to add to the mass about to be operated upon in each case. Having added the requisite amount of a suitable base or salt, we keep the mixture melted, but not at a higher temperature than 212° Fahrenheit, and well stirred, for about an hour, when the useful coloring-matter will have combined with the base or bases introduced, leaving the compound substantially in the same state as if only the amount of acid necessary to combine with the base or bases of the fatty compound, and not with the base or bases of the coloring-compound, had been added in the first instance.

When we employ a solution of any of the above-mentioned bases, either in water or acetic acid, we mix the colored fat with water, to which we add the proper quantity of the dissolved base, the quantity being previously determined by experiment. We then heat the colored fat to a temperature not higher than 212°, and agitate it with the solution of the base until the color associated with the fatty matter has combined with a sufficient quantity of the base to render the combination insoluble, or nearly so, in the petroleum-oil or other fat solvent, or in the melted fat, when the subsequent hot pressure is performed. We then collect the compound matter so obtained, and heat it in a suitable vessel, at a temperature not exceeding 212°, until the whole or the greater portion of the water has been removed. We can now extract the whole of the free fatty matter, leaving separated so much of the coloring-matter as is practically useful for dyeing purposes. This we do by macerating or digesting the mass with petroleum-oil, naphtha, benzole, bisulphide of carbon, oil of turpentine, or similar solvents of fats, filtering and pressing out the solution of fatty matter. The valuable coloring-matter chiefly combined or mixed with alumina, oxide of iron, lime, or with all these or other substances, is thus obtained in a separate state freed, or nearly so, from fatty matter.

In practice, however, we have found it more advantageous to proceed as follows: We heat the combined coloring-matter and fatty materials, when prepared with the requisite acid treatment, as above described, to a temperature of 212° Fahrenheit's thermometer, or thereabout. We put them into strong bags or cloths, and subject them, while hot, to a pressure, in the way well known to the trade of extracting oils or fats from solid matters containing them, until as much as possible of the fatty matter has been squeezed out. The small quantity of fatty matter then remaining will in practice not be found to be injurious in the subsequent process of making a useful dye-stuff from the colored residue. If, however, it be thought necessary more completely to separate the remaining portion of fatty matter, the mass remaining after hot pressure is macerated or digested with petroleum-oil or other solvent of fat in the manner above described. In this case, as well as in the case of separating the fatty matter by petroleum-oil or other solvent of fat without previous hot pressure, we recover the solvent by distillation in a retort or other suitable vessel.

Whether obtained by hot pressure or by solution and separation of the solvent by distillation, the fatty matter, when separated in the manner above described, will be found to be somewhat colored by coloring-matters of little or no value; but it will not be found to contain alizarine or other valuable coloring matter of madder, munjeet, or artificial alizarine; or, if it does contain such, it is in so small a quantity as to be of little or no practical importance.

The fatty matter although somewhat colored will be found to be capable of being profitably used for soap-making and other purposes. But if it be thought desirable to purify it still further, it may be distilled in a retort, with or without steam being blown into it, in the manner well known in the trade of making or purifying stearic acid and other fatty matter. We have now the valuable coloring-matter separated from the fatty matter by petroleum-oil or other solvents, or by hot pressure, with after treatment by petroleum-oil or other solvents of fats, or by hot pressure alone, which we prefer, and we now proceed to describe the manner by which this is purified, which, however, we do not claim as being of our invention. We put the coloring-matter thus left, after having separated wholly or nearly so the fatty matter, into a wooden or other suitable vessel containing water, and add to it a suitable acid, preferring sulphuric or muriatic acid, in such quantity as to have an excess of acid after the macerating or boiling, and either allow the mixture to stand until the bases are separated from the coloring-matter; or we heat or boil the mixture until we arrive at the same result.

In practice we find that one hundred pounds of the colored pressed residue, with about twenty pounds of rectified sulphuric acid of commerce, or about sixty pounds of muriatic acid of commerce, and about ten gallons of water, make a suitable mixture when boiling is employed. When the mixture is not boiled more of the acid is required.

We prefer boiling the mixture. After boiling a sufficient time to produce the required result, which is in general about two hours, the coloring-matter should be washed with cold water until all or nearly all the acid is removed, as is practiced in the making of garancine. We now drain off on a filter as much of the water as possible, and the pasty residue, consisting of alizarine or other coloring-matter of madder and its derivatives, or of munjeet and its derivatives, or artificial alizarine mixed with other organic matter, is left in a state suitable for dyeing or printing; or we can dry and then grind the substance into fine powder for use in this state; or we can separate the pure coloring-matter from the other organic matter by alcohol or other solvents of the coloring-matter of madder and its derivatives, of munjeet and its derivatives, or artificial alizarine, in the manner well-known in the trade of making extract of madder.

Claim.

Having now described the nature of our invention, and the manner of carrying it out, we wish it to be understood that we make no claim generally to the precipitation of waste soap-liquor, with or without coloring-matter by the addition of earthy or metallic salts, or earthy oxides, or oxides of other metals, such process having been in use before the date of this invention; nor do we claim, generally, the separation of fatty matters from solid substances containing them by hot pressure; nor do we claim, generally, the treatment of substances containing the coloring-matter of madder and its derivatives, of munjeet and its derivatives, nor of artificial alizarine with acids, these processes being well known; but

We claim—

The within-described process of recovering both the coloring and fatty matter from waste wash-liquor—that is to say, first treating the matter so as to decompose the fatty parts, forming a combination of the coloring-matter with a suitable base, and then separating the fat from the coloring-matter by pressure or by the use of a solvent, as set forth.

In testimony whereof we have signed our names to this specification in the presence of two subscribing witnesses.

JOHN THOM.
JOHN STENHOUSE.

Witnesses to the signature of JOHN THOM:
  THOMAS EDMUND DAVIES,
  JOHN HUGHES.
Witnesses to the signature of JOHN STENHOUSE:
  BRISTOW HUNT,
  CHAS. AUBREY DAY.